(12) United States Patent
Smits

(10) Patent No.: US 8,573,783 B2
(45) Date of Patent: Nov. 5, 2013

(54) SAFETY DEVICE FOR SCANNED PROJECTOR AND ILLUMINATION SYSTEMS

(76) Inventor: Gerard Dirk Smits, Los Gatos, CA (US)

( * ) Notice: Subject to any disclaimer, the term of this patent is extended or adjusted under 35 U.S.C. 154(b) by 273 days.

(21) Appl. No.: 13/037,949

(22) Filed: Mar. 1, 2011

(65) Prior Publication Data

US 2011/0211243 A1     Sep. 1, 2011

Related U.S. Application Data

(60) Provisional application No. 61/339,269, filed on Mar. 1, 2010.

(51) Int. Cl.
*G03B 21/20* (2006.01)

(52) U.S. Cl.
USPC ............................ 353/85; 353/94; 359/212.1

(58) Field of Classification Search
USPC .................... 353/85, 94, 121, 122; 359/212.1
See application file for complete search history.

(56) References Cited

U.S. PATENT DOCUMENTS

| | | | |
|---|---|---|---|
| 5,052,820 A * | 10/1991 | McGinniss et al. ............ | 374/131 |
| 5,559,322 A | 9/1996 | Jacoby et al. | |
| 5,580,140 A | 12/1996 | Katz et al. | |
| 6,670,603 B2 | 12/2003 | Shimada et al. | |
| 6,982,683 B2 | 1/2006 | Stanton | |
| 7,144,117 B2 | 12/2006 | Kojima | |
| 7,262,765 B2 | 8/2007 | Brown et al. | |
| 7,911,444 B2 | 3/2011 | Yee | |
| 2002/0067466 A1 | 6/2002 | Covannon et al. | |
| 2003/0010888 A1 | 1/2003 | Shimada et al. | |
| 2003/0045034 A1* | 3/2003 | Davis et al. ................... | 438/128 |
| 2003/0202234 A1 | 10/2003 | Taylor et al. | |
| 2004/0218155 A1 | 11/2004 | Schenk et al. | |
| 2005/0035943 A1 | 2/2005 | Kojima | |

(Continued)

FOREIGN PATENT DOCUMENTS

| | | |
|---|---|---|
| JP | 11119184 A | 4/1999 |
| JP | 2003029201 A | 1/2003 |
| WO | 2006063577 A1 | 6/2006 |

OTHER PUBLICATIONS

International Search Report and Written Opinion, PCT/US2011/026691 mailed Oct. 24, 2011.
European Search Report for European Patent Application No. 08837063,0 mailed Nov. 19, 2010.
International Search Report and Written Opinion in International Patent Application No. PCT/US2008/079663 mailed Apr. 30, 2009.
International Search Report in International Patent Application No. PCT/US2011/054751 mailed Jan. 30, 2012.

(Continued)

*Primary Examiner* — Francis M Legasse, Jr.
*Assistant Examiner* — Bao-Luan Le
(74) *Attorney, Agent, or Firm* — Frommer Lawrence & Haug LLP; Patrick R. Turner

(57) ABSTRACT

A scanned projector and illumination system includes an energy-emitting source that is disposed in a projector and that emits energy beams out of the projector through an aperture. A scanning mirror is disposed in the projector and redirects energy beams therein. The scanning mirror moves such that the redirected energy beams form a scanning pattern with a scanning rate. A safety feature is disposed in the projector. The safety feature includes a fuse material. The energy beams move along the fuse material at the scanning rate. The safety feature modulates emission of the energy beams out of the projector through the aperture such that the energy beams are only emitted out of the projector through the aperture when the scanning rate of the energy beams is high enough to prevent the fuse material from reaching a threshold energy level at any location along the fuse material.

20 Claims, 4 Drawing Sheets

(56) References Cited

U.S. PATENT DOCUMENTS

| | | |
|---|---|---|
| 2005/0052635 A1 | 3/2005 | Xie et al. |
| 2005/0099664 A1 | 5/2005 | Yamaoka |
| 2006/0028622 A1* | 2/2006 | Nojima et al. .................. 353/75 |
| 2008/0317077 A1* | 12/2008 | Hoving et al. ............. 372/29.01 |
| 2009/0096994 A1 | 4/2009 | Smits |
| 2010/0002154 A1 | 1/2010 | Hua |

OTHER PUBLICATIONS

International Preliminary Report on Patentability in International Patent Application No. PCT/US2008/079663 mailed Jan. 25, 2010.
Communication Pursuant to Article 94(3) EPC in European Patent Application No. 08837063.0 mailed Oct. 22, 2012.
Communication Pursuant to Article 94(3) EPC in European Patent Application No. 08837063.0 mailed Dec. 27, 2011.

* cited by examiner

SAFETY DEVICE FOR SCANNED PROJECTOR AND ILLUMINATION SYSTEMS

CROSS-REFERENCE TO RELATED APPLICATIONS

This application claims the benefit under 35 U.S.C. §119(e) of U.S. Provisional Patent Application Ser. No. 61/339,269 filed on Mar. 1, 2010, which is incorporated herein by reference.

FIELD

The present invention is directed to scanned projector and illumination systems and methods of using the systems. The present invention is also directed to scanned projection and illumination systems that include safety measures for disabling energy beam emission from a projector when an unsafe energy threshold is met or exceeded, as well as methods of using the safety measures, projectors, and scanning projector and illumination systems.

BACKGROUND

Scanned projector and illumination systems, such as scanning laser devices, have many uses including, for example, home theatre and digital cinema applications. Additionally, when lasers are used in such scanned projector and illumination systems, such systems can be used, for example, for machine vision systems, vehicle illumination, scanned laser light detection and ranging ("LIDAR") systems, or the like. Scanned projector and illumination systems can potentially be used in vehicles and other consumer applications, as well.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings, wherein.

DETAILED DESCRIPTION

Figure 1A:
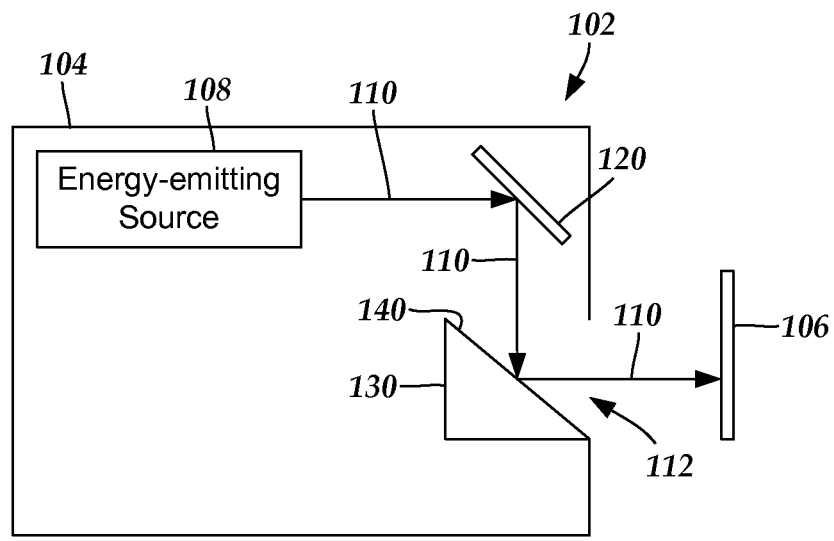
FIG. 1A is a schematic view of one embodiment of a scanned projector and illumination system that emits energy beams from a projector to a remote surface, according to the invention.

The present invention is directed to scanned projector and illumination systems and methods of using the systems. The present invention is also directed to scanned projection and illumination systems that include safety measures for disabling energy beam emission from a projector when an unsafe energy threshold is met or exceeded, as well as methods of using the safety measures, projectors, and scanning projector and illumination systems.

The present disclosure will now be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. As used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

Scanned projection and illumination systems that use lasers, such as pixel sequential projectors, sometimes referred to as "flying spot" laser projectors, scanned laser illuminators, scanned LIDAR systems, or the like, emit very bright energy beams of a single wavelength and polarization. Emitted energy beams can be easily collimated, modulated, and filtered without substantial optical losses. Accordingly, scanned laser projection and illumination systems have many applications. An example of a scanned laser projection and illumination system is found in, for example, U.S. Patent Application Publication No. 2009/0096994, which is incorporated by reference.

The emission of bright collimated energy beams from scanned laser projector and illumination systems can potentially create a safety hazard, particularly for eye safety. For example, when laser energy beams are viewed directly they can deliver excessive energy to the retina, potentially causing permanent vision loss. Since scanned laser projection and illumination systems have the potential to increase energy efficiency of many applications (e.g., home theatre and digital cinema applications, machine vision systems, vehicle illumination, scanned LIDAR systems, or the like), it is desirable to reduce, or even eliminate, potential eye safety hazards.

Currently, eye safety restrictions, such as ANSI Z 136.1, limit scanning "Pico projectors" to illumination levels below 15 lumens. Generally, such projectors need to comply with Class 1 or 2 laser safety limits, which may also apply to laser pointers. In the case of higher lumen output projection and illumination systems, such as scanned laser projection and illumination systems, in order to reduce emitted energy beams to a safe level, the emitted energy beams are spread (de-collimated) into a scanning line or field that is then imaged (i.e., modulated into pixels) by a linear or array imaging device. The process of spreading, imaging, and re-collimating makes such systems complex and optically challenging. Additionally, these processes may add to the bulk and cost of such systems. Moreover, these processes can greatly diminish the overall efficiency of such systems. Re-collimating energy beams may be particularly a concern for portable projectors configured and arranged for embedding in mobile devices.

In at least some cases, spreading emitted energy beams into scanning lines or fields may be sufficient to avoid creating a viewer safety hazard. However, when an emitted energy beam is directly viewed close to a collimator lens, such systems may still cause eye injury. Thus, even in systems where emitted energy beams are spread into scanning lines or fields an additional safety mechanism may be required, especially when such devices are marketed to children. Indirectly or directly, the safety hazard severely restricts the deployment of efficient and higher resolution direct laser projection and illumination systems.

As herein described, a scanned projection and illumination system includes a safety feature that operates as a fuse. In at least some embodiments, the safety feature is formed as a plurality of layers of material that includes a fuse material. The plurality of layers of material can be disposed on, for example, a mirror, a transmissive element (e.g., a prism, or the like), a window, or the like.

The safety feature modulates emission of energy beams from a projector of the scanned projection and illumination system by only permitting energy beams to be emitted from the projector when the energy beams are scanned at a rate that is high enough that, when the fuse material is exposed to the energy beams prior to the energy beams being emitted out of the projector, the fuse material does not rise above a threshold energy level at any single location on the fuse material. In some cases, the threshold energy value of the fuse material is set to a level sufficient for maintaining safe energy levels of energy beams emitted from the projector.

In the case of fuse mirrors, under normal operation generated energy beams are reflected from the fuse mirror out of the projector. When an energy threshold level is met or exceeded, the fuse mirror becomes non-reflective (e.g., the fuse mirror becomes transmissive). Consequently, the energy beam is no longer directed out of the projector. In some cases, the energy threshold is predetermined.

In some cases, when the fuse mirror becomes non-reflective one or more sensors sense the transmissiveness of the fuse mirror and disable further energy-beam emission. In alternate embodiments, the safety feature is formed as a safety window, where, under normal operation, enables energy beams to pass through fuse material disposed on the fuse window, and, when energy levels at any single location of the fuse material meet or exceed threshold energy levels the fuse window becomes opaque, or reflective, thereby disabling transmission of the energy beams through the fuse window.

FIG. 1A is a schematic view of one embodiment of a scanned projector and illumination system 102. The scanned projector and illumination system 102 includes a projector 104 and a remote surface 106, such as a screen, external to the projector 104 upon which energy beams are directed. An energy-emitting source 108 is disposed in the projector 104. Generated energy beams, such as laser light, are emitted from the energy-emitting source 108. In FIG. 1A and in other figures, energy beams 110 are shown being emitted by the energy-emitting source 108, through an aperture 112 in the projector 104, to the remote surface 106. The energy beams 110 are reflected from a scanner (such as a scanning mirror 120) and a fuse mirror 130 between the energy-emitting source 108 and the remote surface 106.

In some instances, the scanning mirror 120 is configured and arranged to move (e.g., rotate, revolve, tilt, pivot, wobble, rock, or the like). The movement of the scanning mirror 120 alters the angle upon which the emitted energy beam 110 reflects to the fuse mirror 130. Consequently, the energy beam 110 moves along a reflective surface 140 of the fuse mirror 130 over time. The movement of the energy beam 110 along the reflective surface 140 of the fuse mirror 130 causes the energy beam 110 to contact different portions of the remote surface 106 over time. Accordingly, movement of the scanning mirror 120 enables scanning of the energy beam 110 along the remote surface 106 over time.

Figure 1B:
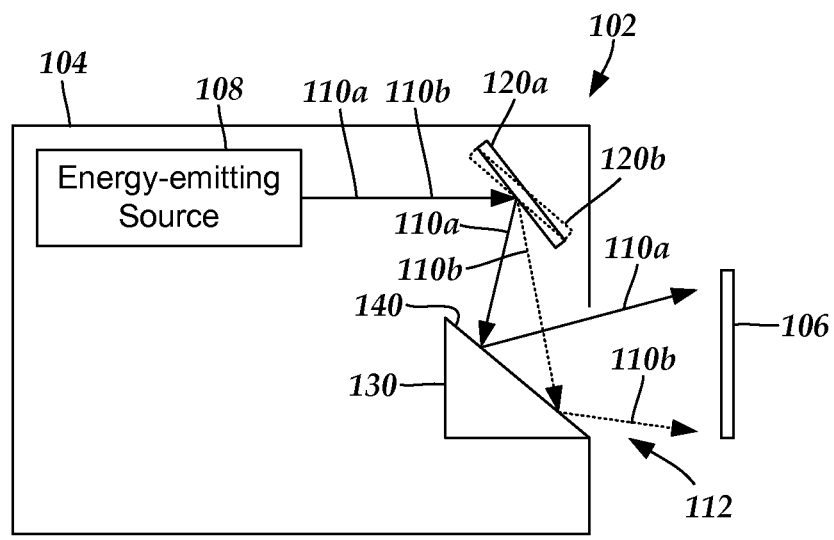
FIG. 1B is a schematic view of one embodiment of the scanned projector and illumination system of FIG. 1A, the scanned projector and illumination system including a mirror that moves, thereby causing emitted energy beams from a projector to contact a remote surface at different location in a scanned manner, according to the invention.

FIG. 1B is a schematic view of one embodiment of the scanned projector and illumination system 102. In FIG. 1B, the scanning mirror is concurrently shown in a first position 120*a* and in a dotted second position 120*b*. Energy beam 110*a* is shown being reflected off of the scanning mirror in the first position 120*a*, thereby causing the energy beam 110*a* to reflect off the fuse mirror 130 such that the energy beam 110*a* contacts the remote surface 106 in proximity to a top portion of the remote surface 106. Energy beam 110*b* is shown being reflected off of the scanning mirror in the second position 120*b*, thereby causing the energy beam 110*b* to reflect off the fuse mirror 130 such that the energy beam 110*b* contacts the remote surface 106 in proximity to a bottom portion of the remote surface 106. It will be understood that the movement of the scanning mirror in FIG. 1B (and the resulting scanning pattern) is merely exemplary and is not meant to be limiting. Any suitable scanning pattern can be enabled through predetermined movements of the scanning mirror 120.

During normal operation, the scanning mirror 120 moves at a continual high speed and frequency. In at least some embodiments, the scanning mirror 130 has a line-scanning rate of at least 10 kHz. In at least some embodiments, the scanning mirror 130 has a line-scanning rate that is no greater than 100 kHz. In at least some embodiments, the scanning mirror 130 has a line-scanning rate that is at least 10 kHz and is no greater than 100 kHz.

The scanned projector and illumination system 102 may be designed such that the continual movement of the energy beams 110 along the reflective surface 140 of the fuse mirror 130 causes the energy of the energy beams 110 to be temporally and spatially spread, thereby preventing a "hot spot" to be formed at a one or more locations on the reflective surface 140 of the fuse mirror 130 and maintaining the amount of energy delivered to any one point on the reflective surface 140 of the fuse mirror 130 below a threshold energy level (e.g., within a safe limit).

Despite implementation of scanning to reduce the amount of energy delivered to any one point, potential hazards may develop when the scanning mirror 120 malfunctions (e.g., the scanning mirror 120 stops moving or slows down to a level that causes energy levels to dangerously rise along contacted portions of the fuse mirror 130, or the remote surface 106, or any surface external to the projector 104 (e.g., a retina of a user of the device within which the projector 104 is disposed)). Such hazards can occur for any number of reasons including, for example, an electrical malfunction, a manufacturing defect, component failure, or the like.

The fuse mirror 130 operates as a safety measure to disable emission of the energy beams 110 through the aperture 112 of the projector 104 when the energy levels received at any location along the fuse material of the fuse mirror 130 rise to (or above) a predetermined threshold level. In the exemplary scanned projector and illumination system 102 shown in FIGS. 1A-1B (as well as in subsequent figures), the fuse mirror 130 disables (or at least greatly diminishes) reflection of the energy beams 110 along the fuse mirror 130. Consequently, the energy beams no longer can reflect through the aperture 112 at an unsafe level.

Figure 2:
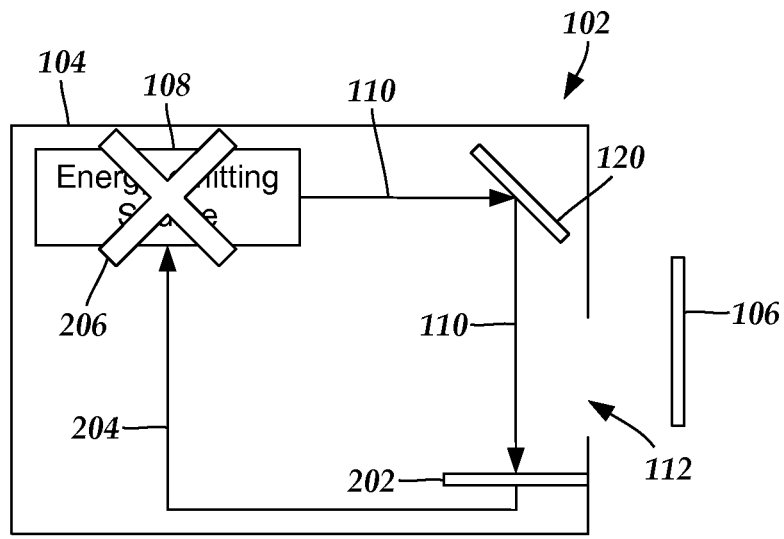
FIG. 2 is a schematic view of one embodiment of the scanned projector and illumination system of FIG. 1A, the scanned projector and illumination system missing a reflective fuse mirror, thereby containing an emitted energy beam within a projector of the system, according to the invention.

FIG. 2 is a schematic view of one embodiment of the scanned projector and illumination system 102. The fuse mirror 130 is removed to show containment of the energy beams 110 within the projector 104. As shown by FIG. 2, when the fuse mirror 130 is removed from the projector 104, the energy beams 110 emitted from the energy-emitting source 108 are reflected from the scanning mirror 120, but are prevented from being reflected out of the projector 104 through the aperture 112.

In some cases, the energy beams 110 may be directed from the scanning mirror 120 into a surface within the projector 104 that absorbs or defuses the energy within the energy beam 110. The energy absorbing surface can be an inner surface of a casing of the projector 104, or another surface within the projector 104. In at least some embodiments, the energy beam 110 is directed to one or more sensors 202 (e.g., a photosensor, or the like). The one or more sensors 202 may be coupled (as shown by arrow 204) to the energy-emitting source 108 such that, when the one or more sensors 202 sense the energy beam 110, the energy-emitting source 108 may be disabled, as shown by the "X" 206 over the energy-emitting source 108.

Figure 3:
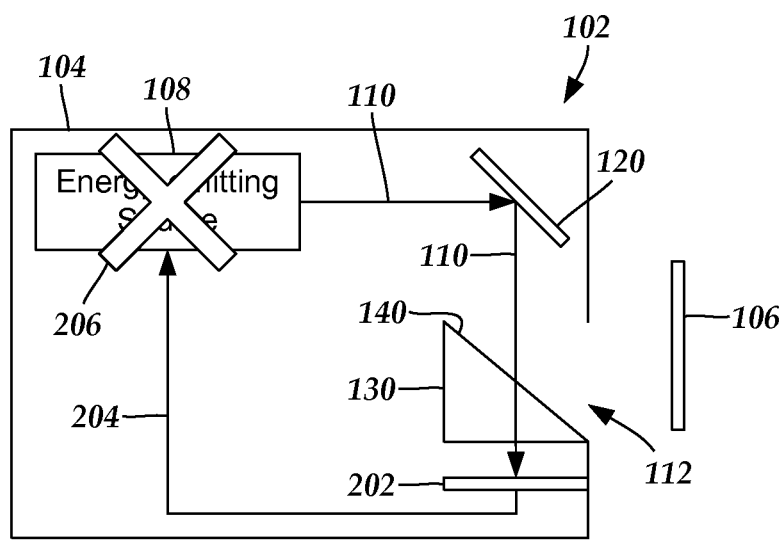
FIG. 3 is a schematic view of one embodiment of the scanned projector and illumination system of FIG. 1A, the scanned projector and illumination system including a non-reflective fuse mirror, thereby containing an emitted energy beam within a projector of the system, according to the invention.

FIG. 3 is a schematic view of one embodiment of the scanned projector and illumination system 102. In FIG. 3, the energy of the energy beam 110 has met or exceeded the predetermined threshold level and, consequently, the fuse mirror 130 is no longer reflective. As shown in FIG. 3, the result is similar to what happens when the fuse mirror 130 is removed from the projector 104, that is, the energy beam 110 is not reflected out of the aperture 112 to the scanned surface 106. Instead, the energy beam 110 is absorbed or defused within the projector 104. In FIG. 3, the energy beam 110 is shown contacting the one or more sensors 202 which, in turn, disables the energy-emitting source 108.

The fuse mirror 130 can operate in any suitable manner to reduce reflectivity when an energy level of the fuse material rises to a threshold energy level. In at least some embodiments, the fuse mirror 130 includes one or more layers of materials in addition to the fuse material. At least one of the plurality of layers includes the reflective surface 140 configured and arranged to only reflect the energy beam 110 as long as the energy threshold is not met or exceeded.

In some embodiments, the energy threshold is set in accordance with a desired safety limit. The energy threshold can be defined as an upper limit to energy radiated within a certain solid angle, which may be correlated to radiated surface area in the fuse mirror 130 within a given time interval (see e.g., ANSI Z 136.1, Maximum Exposure Limits for certain wavelengths set in $W/cm^2$ or $J/cm^2$).

As discussed above, under normal operating conditions the motion of the scanning mirror 120 causes motion of the energy beam 110 along the fuse mirror 130 which, in turn, prohibits the energy threshold along the fuse material disposed on or in the fuse mirror 130 from being met or exceeded at any one point and at any time on the fuse material. In which case, the fuse mirror 130 may operate as a regular reflector that can be, for example, 99% to 99.5% reflective.

The fuse mirror 130 can be either a first surface mirror or a second surface mirror. In at least some instances, a first surface mirror might be preferred to avoid coma and losses associated with second surface mirrors. The fuse mirror 130 can be any suitable shape that enables redirection of energy beams upon the occurrence of energy levels rising to a threshold energy level at one or more points along the reflective surface of the fuse mirror 130. In at least some embodiments, the fuse mirror 130 operates passively and does not require electronics or software. In at least some embodiments, the fuse mirror 130 is removable from the projector 104. In at least some embodiments, the fuse mirror 130 is replaceable from the projector 104.

When the energy threshold of the fuse material is met or exceeded at any point, the surface of the fuse mirror 130 becomes substantially non-reflective, and the power of the reflected energy beam is greatly diminished, or even wholly quenched.

Any suitable method can be used to enable a fuse material to behave as an energy cutoff with a set threshold. Several such methods are described below. However, it will be understood that other methods can be equally effectively deployed.

In at least some embodiments, the reflective surface 140 is a coating. In some cases, for example, the reflective surface 140 may include an enhanced metallic coating of a suitable metal, such as aluminum, silver, or other such suitable mirror coating. In at least some embodiments, the reflective surface 140 has a thickness of at least 50 nm. In at least some embodiments, the reflective surface 140 has a thickness that is no greater than 150 nm, 125 nm, 100 nm, 75 nm, 50 nm. In at least some embodiments, the reflective surface 140 has a thickness of approximately 100 nm. Despite being a thin surface, the reflective surface 140 reflects an overwhelming majority of the incident energy of the energy beam (approximately 99%). However, a small fraction of the energy beam's incident energy (approximately 1%) may be absorbed in the mirror surface. The absorbed energy dissipates along the materials of which the mirror surface is composed, as well as any backing materials, and any coatings which may be used to protect the reflective surface 140.

By selecting materials with desired heat dissipation constants and desired mirror-surface thicknesses, an incident energy beam that contacts the surface of the fuse mirror 130 with an energy level that meets or exceeds the threshold level may cause the formation of a hot spot on the fuse material, which is disposed in proximity to the mirror surface. The hot spot has a level of energy that exceeds a level that can be dissipated instantaneously to the surrounding area. As a result, a failure occurs along at least a portion of the surface of the fuse mirror 130. The failure may include one or more of melting, burning, a chemical reaction, a phase transition (e.g., like a CD recording), or the like.

In some cases, a positive feedback loop may be implemented, such that as a greater proportion of the energy is absorbed, a greater heating or transition results, thus triggering a high gain or avalanche response. In some cases, failure may be reversible. In other cases, failure may be catastrophic (irreversible). In which cases, the fuse mirror 130, or a portion thereof, may be removable and replaceable, as desired.

Optionally, a failure can be detected and recorded, and in some cases, may be verified. In some cases, such services may be part of a monitoring service (e.g., as part of the warrantee), and to may enable safe operation compliance to be certified by a third party.

Figure 4A:
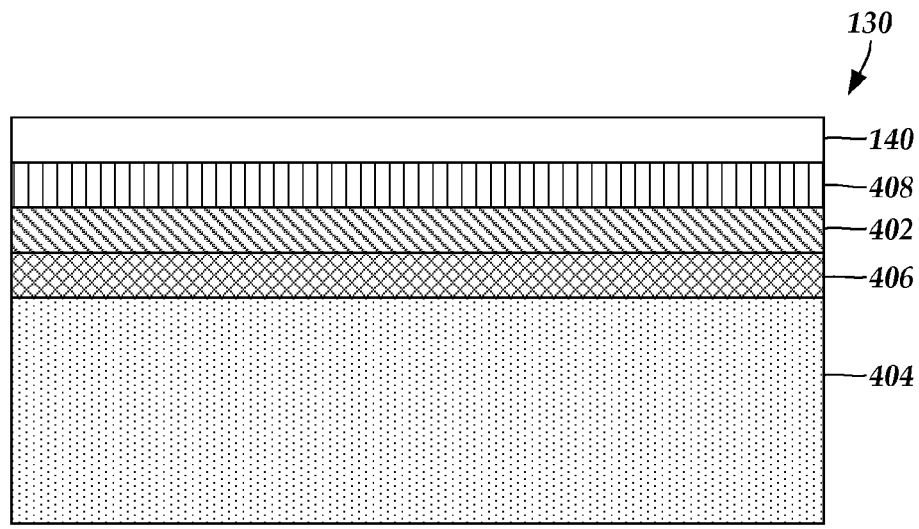
FIG. 4A is a schematic side view of one embodiment of a plurality of layers of the fuse mirror of FIG. 3, according to the invention.

Turning to FIG. 4A, the fuse mirror 130 may include one or more layers of materials in proximity to the reflective surface of the fuse mirror 130 that modulate failure of the fuse mirror 130 when energy levels rise to (or above) a threshold level. In at least some embodiments, the fuse mirror 130 includes the layer of fuse material that melts, sublimes, reacts, changes phase, changes color, changes opacity, or the like, when energy levels rise to (or above) a threshold level.

In some cases the layers of the fuse mirror 130 are arranged such that a fuse layer disposed beneath the reflective surface melts, sublimes, or the like, when the temperature of the fuse rises to a threshold activation temperature. Melting, subliming, or the like of the fuse material causes a corresponding rapid and significant reduction, or even a complete loss, of the reflectivity of the fuse mirror 130.

FIG. 4A is a schematic side view of one embodiment of layers of the fuse mirror 130. In FIG. 4A, the fuse mirror 130 includes a fuse material 402 sandwiched between the reflective surface 140 and a substrate 404. In the embodiment shown in FIG. 4A, the fuse material 402 has a threshold temperature at which the fuse material 402 melts, sublimes, or the like. This temperature can be set to a level that is above temperatures experienced during normal operation of the system 102.

The fuse material 402 shown in FIG. 4A can be any suitable material including, for example, one or more chalcogenides (e.g., $Ge_2Sb_2Te_5$, a $Sb_2Te_3$—GeTe system, or the like), a low-melting-point metal/alloy (e.g., In, Sn, Pb, Bi, I, or the like), a low sublimation/melting temperature organic material, or the like. One or more of composition or thickness of the layer of fuse material 402 may be tailored to affect the threshold reaction temperature.

The fuse mirror 130 can, optionally, include one or more additional layers. For example, an absorber layer 406 may be disposed between the fuse material 402 and the substrate 404. As another example, a heat diffusion barrier layer 408 may be disposed between the fuse material 402 and the reflective surface 140.

The fuse material 402 can be configured and arranged to either melt or volatize at a known temperature (e.g., at approximately 400 C for $Ge_2Sb_2Te_5$). The melting or volatizing of the fuse material 402 may, in turn, cause permanent destruction of the reflective surface 140. The absorbed laser power and the thermal properties of the thin film stack (layers 140, 406, and 408) and the substrate 404 can determine the temperature of the fuse material 402. Thus, the layers 140, 406, and 408, and the substrate 404 can determine when the reflective surface 140 is destroyed.

In at least some embodiments, when the temperature of the fuse material 402 exceeds a threshold temperature, it destroys the reflective surface 140, thereby forming a hole to the absorber layer 406. In at least some embodiments, once a hole is formed in the absorber layer 406, the incident energy beam 110 is then absorbed by the absorber layer 406, by the substrate 404, or, alternatively, transmitted through a transparent substrate with no absorber layer.

The optional heat diffusion layer 408 (e.g., $SiO_2$, or the like) can be used to determine the precise amount of heat that conducts from the reflecting surface 140 (above the heat diffusion layer 408) to the fuse material 402 (below the heat diffusion layer 408).

An exemplary configuration of one narrow embodiment may include a reflective surface 140 formed from silver, the reflective surface 140 having a thickness of approximately 100 nm and a reflectivity of approximately 99%. The heat diffusion barrier 408 may be formed from $SiO_2$ and may also have a thickness of approximately 100 nm. The fuse material 402 may be formed from $Ge_2Sb_2Te_5$ and have a thickness of approximately 200 nm.

Figure 4B:
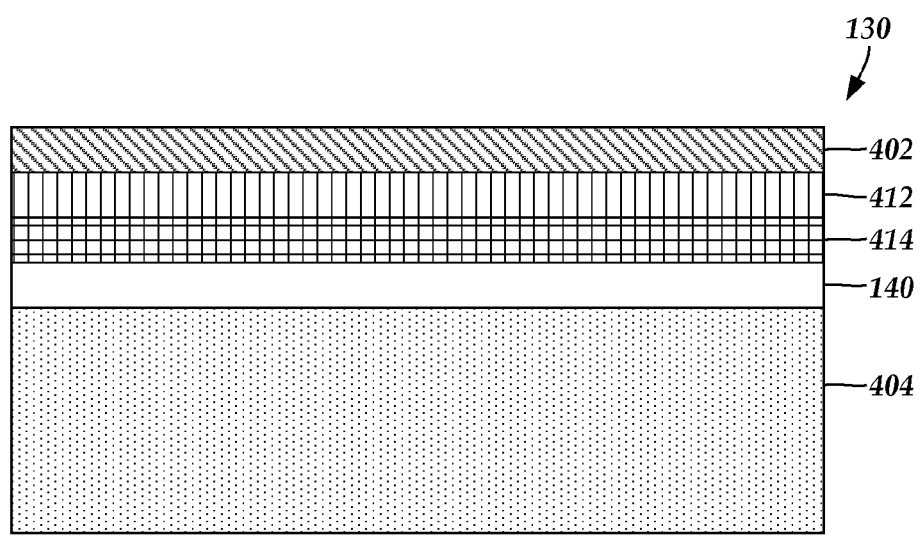
FIG. 4B is a schematic side view of another embodiment of a plurality of layers of the fuse mirror of FIG. 3, according to the invention.

Turning to FIG. 4B, in some cases the layers of the fuse mirror 130 are arranged such that the fuse material 402 is disposed above the reflective surface 140 and changes opacity when at least one of the temperature or the energy level of the fuse material 402 rises to a threshold activation temperature or energy level, respectively. Increasing the opacity of the fuse mirror 130 may cause the fuse mirror 130 to absorb rather than reflect. In some cases, the fuse mirror 130 can utilize materials with photo-darkening properties. Photo darkening is the effect that the optical losses in a medium can grow when the medium is exposed to energy, such as light at certain wavelengths. In some instances, photo darkening can reversibly create absorption centers in optical media in response to being illuminated with light.

FIG. 4B is a schematic side view of another embodiment of layers of the fuse mirror 130. In FIG. 4B, the fuse mirror 130 includes the reflective surface 140 sandwiched between the fuse material 402 and the substrate 404. During normal operation of the system 102, the fuse material 402 is transparent. In the embodiment shown in FIG. 4B, the fuse material 402 has a threshold temperature/energy level at which the fuse material 402 becomes opaque. This temperature is set to a level that is above temperatures experienced during normal operation of the system 102.

The fuse material 402 shown in FIG. 4B can be any suitable material including, for example, one or more transparent organics that react with oxygen to form an opaque layer at or above a threshold temperature, one or more transparent organics and dielectrics that react with each other at or above a threshold temperature to become opaque, one or more thermochromic or photochromic leuco-dyes that transition from transparent to opaque at a threshold temperature or energy exposure threshold (e.g., thermally-activated ink on receipt paper, or the like), or the like. One or more of composition or thickness of the layer of fuse material 402 may be tailored to affect the threshold reaction temperature.

The fuse mirror 130 can, optionally, include one or more additional layers. For example, a first heat diffusion barrier or reactant layer 412, or a second heat diffusion barrier or reactant layer 414. In at least some embodiments, one or more of the layers 412 and 414 are disposed between the fuse material 402 and the reflective surface 140.

The fuse material 402 may become opaque at a certain threshold temperature (thermochromic), or at a threshold of time-integrated laser intensity (photochromic), or it becomes opaque through a chemical reaction with the air or adjacent reactant layer 414 at a threshold temperature. The temperature is controlled by one or more of the absorbed energy, scanning velocity, the thin film geometry (e.g., thicknesses of these layers), and the thermophysical properties of the materials. When the fuse material 402 becomes opaque, reflection from the reflective surface 140 below is diminished, or even destroyed. Additionally, this may set up a positive feedback loop where, as more heat is absorbed, it causes further rapid transformation of these surfaces, including possible destruction of the reflective surface layer 140.

In at least some embodiments, the layers of materials shown in FIG. 4B have similar relative thicknesses of the layers shown in FIG. 4A. Typically, the energy beam 110 (e.g., a laser beam, or the like) can be focused to a spot, or collimated into a beam, ranging from 1 µm an to 500 µm. Generally, the more concentrated the energy of the energy beam 110, and the slower the scanning velocity, the thinner the layer of fuse material 402, the thinner the reflective surface 140, and the faster the fuse mirror 130 "blows" once the threshold is met, or exceeded.

Figure 5A:
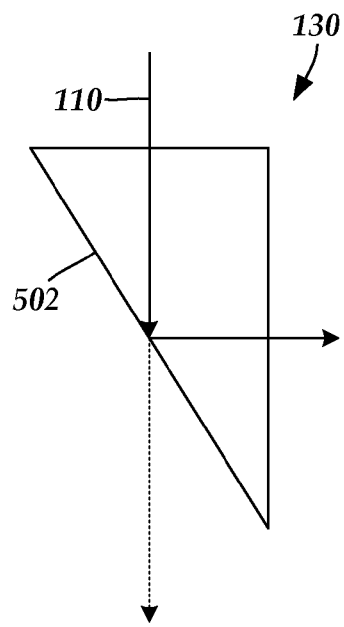
FIG. 5A is a schematic view of another embodiment of the fuse mirror of FIG. 3, the fuse mirror formed as a transmissive element, according to the invention.
Figure 5B:
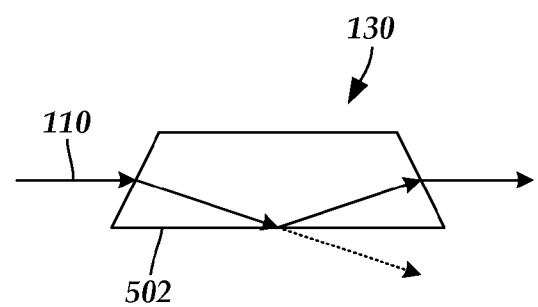
FIG. 5B is a schematic view of yet another embodiment of the fuse mirror of FIG. 3, the fuse mirror formed as a transmissive element, according to the invention.

In at least some embodiments, instead of reflecting, the energy beam may be transmitted through an optical transmissive element, such as a prism, where one of the surfaces acts as the fuse mirror 130. FIG. 5A is a schematic view of the energy beam 110 contacting another embodiment of the fuse mirror 130. FIG. 5B is a schematic view of the energy beam 110 contacting yet another embodiment of the fuse mirror 130. The fuse mirror 130 is formed as an optically transmissive element, such as a prism. In both embodiments, shown in FIG. 5A and FIG. 5B, one of the surfaces 502 of the fuse mirror 130 operates as the reflective surface of the fuse mirror 130.

Figure 6A:
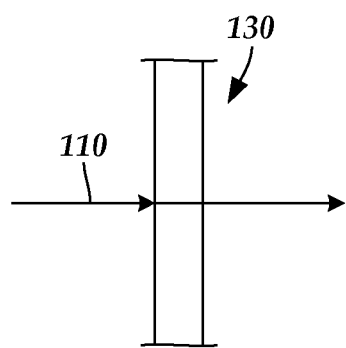
FIG. 6A is a schematic view of one embodiment of an energy beam contacting a fuse window, the energy beam transmitting though the fuse window when an energy threshold is neither met nor exceeded by the energy beam, according to the invention.
Figure 6B:
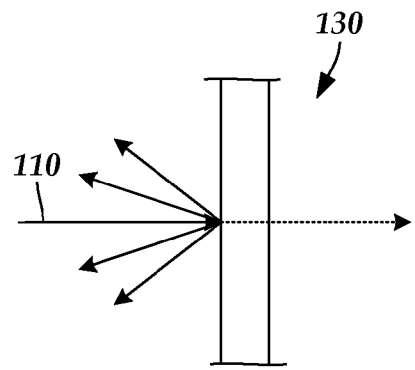
FIG. 6B is a schematic view of one embodiment of an energy beam contacting the fuse window of FIG. 6A, the energy beam being mostly reflected from the fuse window when an energy threshold is met or exceeded by the energy beam, according to the invention.

In at least some embodiments, instead of a mirror, the energy beam 110 can be transmitted through a window with a plurality of layers of materials (e.g., one or more optical coatings, or the like) which can go from transparent to opaque, diffuse, or reflective, thereby causing attenuation of the energy beam 110. FIG. 6A is a schematic view of one embodiment of the energy beam 110 contacting a portion of a fuse window 602. In FIG. 6A, the energy beam is shown transmitting though the fuse window 602, for example, when an energy threshold of fuse material disposed on the window 602 is neither met nor exceeded by the energy beam 110. FIG. 6B is a schematic view of one embodiment of the energy beam 110 mostly reflecting from a surface 604 of the fuse window 602, for example, when an energy threshold of the fuse material disposed on the window 602 is met or exceeded by the energy beam 110.

In other alternate embodiments, the fuse mirror can be implemented as a plurality of layers of materials (e.g., one or more optical coatings, or the like) disposed on an existing mirror, such as one or more mirrors already disposed in an optical design (e.g., the scanning mirror 120, or the like). The fuse mirror does not need to be a separate and additional mirror component. At least some laser scanner systems (e.g., LIDAR systems, or the like) use high-speed polygonal rotating mirrors to make the energy beam(s) move. In such cases, the surface of the scanning mirror itself can operate as a fuse mirror. The mirror surface of a polygonal rotating mirror is moving. Typically, the energy beam is stationary (but not always), but the principle remains the same—when the movement between the energy beam and the mirror slows down below a certain critical parameter set by the fuse design, the mirror surface "auto-destructs."

The above specification, examples and data provide a description of the manufacture and use of the composition of the invention. Since many embodiments of the invention can be made without departing from the spirit and scope of the invention, the invention also resides in the claims hereinafter appended.

What is claimed as new and desired to be protected by Letters Patent of the United States is:

1. A scanned projector and illumination system, the system comprising;
    a projector with an aperture;
    an energy-emitting source disposed in the projector, the energy-emitting source configured and arranged to emit energy beams within the projector that are directed out of the projector through the aperture;
    a scanning mirror disposed in the projector, the scanning mirror configured and arranged to redirect the energy beams emitted by the energy-emitting source prior to the energy beams passing through the aperture, wherein the scanning mirror is configured and arranged to alter an angle from which the energy beams reflect from the scanning mirror such that the energy beams reflect in different directions from the scanning mirror over time, thereby forming a scanning pattern with a scanning rate; and
    a safety feature disposed in the projector, the safety feature comprising a fuse material that is contacted by the energy beams such that the energy beams move along the fuse material at the scanning rate, the safety feature modulating emission of the energy beams out of the projector through the aperture such that the energy beams are only emitted out of the projector through the aperture when the scanning rate of the energy beams is high enough to prevent the fuse material from reaching a threshold energy level at any location along the fuse material;
    wherein the fuse material comprises at least one thermoehromic or photochromic leuco-dye that transitions from transparent to opaque at a threshold temperature or energy-exposure threshold.

2. The system of claim 1, wherein the fuse material is disposed on or in a fuse mirror comprising a reflective surface, the fuse mirror disposed in the projector such that the energy beams are directed out of the projector through the aperture by being redirected by the reflective surface of the fuse mirror.

3. The system of claim 1, wherein the safety feature further comprises at least one of an absorber layer or a heat diffusion barrier layer.

4. The system of claim 1, wherein the fuse material is disposed on or in a transmissive element that comprises a reflective surface, the transmissive element disposed in the projector such that the energy beams are directed out of the projector through the aperture by being redirected by the reflective surface of the transmissive element.

5. The system of claim 1, wherein the fuse material is disposed on or in a planar surface of a window, the window disposed in the projector such that the energy beams are directed out of the projector through the aperture by being emitted through the planar surface of the window.

6. The system of claim 2, wherein the fuse material is disposed over the reflective surface.

7. The system of claim 2, wherein the safety feature further comprises a substrate.

8. The system of claim 2, wherein the fuse material is configured and arranged such that when the fuse material reaches or exceeds the threshold energy level at any location along the fuse material, the reflective surface of the fuse mirror ceases being reflective, thereby preventing the energy beams from being directed out of the projector through the aperture.

9. A method for using a scanned projector and illumination system, the method comprising:
providing the scanned projector and illumination system of claim 2;
emitting an energy beam from the energy-beam emitting source of the scanned projector and illumination system;
redirecting the emitted energy beam from the scanning mirror of the scanned projector and illumination system to the fuse mirror of the scanned projector and illumination system such that the energy beam moves along the fuse material of the fuse mirror at the scanning rate;
redirecting the energy beam from the fuse mirror through the aperture of the projector of the scanned projector and illumination system to a location external to the projector; and
absorbing the energy beam within the projector such that the energy beam no longer is emitted through the aperture of the projector to the location external to the projector when the fuse material reaches a threshold energy level at any location along the fuse material.

10. The system of claim 7, wherein the fuse material is disposed between the reflective surface and the substrate.

11. The system of claim 8, further comprising a sensor disposed in the projector, the sensor configured and arranged to disable the energy-emitting source when the reflective surface of the fuse mirror ceases being reflective.

12. The system of claim 8, wherein the reflective surface of the fuse mirror is configured and arranged to temporarily cease being reflective.

13. The system of claim 8, wherein the reflective surface of the fuse mirror is configured and arranged to permanently cease being reflective.

14. The method of claim 9, wherein providing the scanned projector and illumination system comprises providing the scanned projector and illumination system, wherein the fuse material is disposed over the reflective surface.

15. The method of claim 9, wherein providing the scanned projector and illumination system comprises providing the scanned projector and illumination system, wherein the safety feature further comprises a substrate.

16. The method of claim 9, wherein absorbing the energy beam within the projector such that the energy beam no longer is emitted through the aperture of the projector comprises removing the reflecting ability of the reflective surface of the fuse mirror.

17. The method of claim 15, wherein providing the scanned projector and illumination system comprises providing the scanned projector and illumination system, wherein the fuse material is disposed between the reflective surface and the substrate.

18. The method of claim 16, further comprising using a sensor to disable the energy-emitting source when the reflecting ability of the reflective surface is removed.

19. The method of claim 16, wherein removing the reflecting ability of the reflective surface of the fuse mirror comprises temporarily removing the reflecting ability of the reflective surface of the fuse mirror.

20. The method of claim 16, wherein removing the reflecting ability of the reflective surface of the fuse mirror comprises permanently removing the reflecting ability of the reflective surface of the fuse mirror.

* * * * *